United States Patent [19]
Van Niekerk

[11] Patent Number: 5,503,033
[45] Date of Patent: Apr. 2, 1996

[54] METHOD AND SERVICING INTERIOR OF LARGE CONTAINER AND SERVICE APPARATUS

[75] Inventor: Erasmus Van Niekerk, Courcerault, France

[73] Assignee: Tric Holdings Limited, Hamilton, Bermuda

[21] Appl. No.: 288,273

[22] Filed: Aug. 8, 1994

[30] Foreign Application Priority Data

Aug. 10, 1993 [ZA] South Africa ............. 93/5806
May 3, 1994 [ZA] South Africa ............. 94/3039

[51] Int. Cl.⁶ ............................. B08B 9/00
[52] U.S. Cl. ............................. 73/865.8
[58] Field of Search .............. 73/865.8, 864.71; 376/245; 248/323, 327–329; 182/152; 15/165; 134/167 R, 168 C, 113

[56] References Cited

U.S. PATENT DOCUMENTS

| | | | |
|---|---|---|---|
| 2,017,042 | 10/1935 | Dougherty | 134/167 C |
| 2,037,870 | 4/1936 | Whisler et al. | 15/165 |
| 2,581,480 | 1/1957 | Hadley . | |
| 3,106,491 | 10/1963 | Leibner . | |
| 3,448,474 | 6/1969 | Goodrum . | |
| 3,905,061 | 9/1975 | Cradeur . | |
| 3,994,365 | 11/1976 | Petermann et al. . | |
| 3,998,292 | 12/1976 | Holterbosch | 182/152 |
| 4,027,349 | 6/1977 | Clavin . | |
| 4,302,772 | 11/1981 | Gillot | 348/82 |
| 4,905,527 | 3/1990 | Harth et al. | 73/865.8 |
| 5,179,757 | 1/1993 | Grant, Jr. . | |

FOREIGN PATENT DOCUMENTS

| | | | |
|---|---|---|---|
| 2289249 | 5/1976 | France . | |
| 158811 | 4/1981 | German Dem. Rep. . | |
| 2154015 | 6/1973 | Germany . | |
| 467010 | 2/1969 | Switzerland . | |
| 0764752 | 9/1980 | U.S.S.R. | 134/167 R |
| 1039882 | 8/1966 | United Kingdom | 182/152 |
| 2251019 | 6/1992 | United Kingdom | 182/152 |

OTHER PUBLICATIONS

Soviet Patent Abstracts Section PQ, Week 9236 21 Oct. 1992 Derwent Publications–SU 1692688 (91–11–23).
Japanese Patent Abstracts–vol. 15 No. 285 (C–851) JP 3098686 24-04-91.

*Primary Examiner*—Robert Raevis
*Attorney, Agent, or Firm*—Ladas & Parry

[57] ABSTRACT

A large container 12 has a narrow top opening 14. An apparatus 10 is collapsible to be insertable into the container via the opening. When inside the container, arms 18 are opened outwardly from a central chine 24. Castor wheels at ends of the arms roll along an inner wall surface 18 to stabilize the apparatus and to allow displacement thereof. Service operations such as inspection, cleaning, maintenance and repair of the surface can be effected from the apparatus which serves as a platform. The service operations can be effected manually, or by means of remote controlled or automatically controlled service devices mounted on an arm.

14 Claims, 5 Drawing Sheets

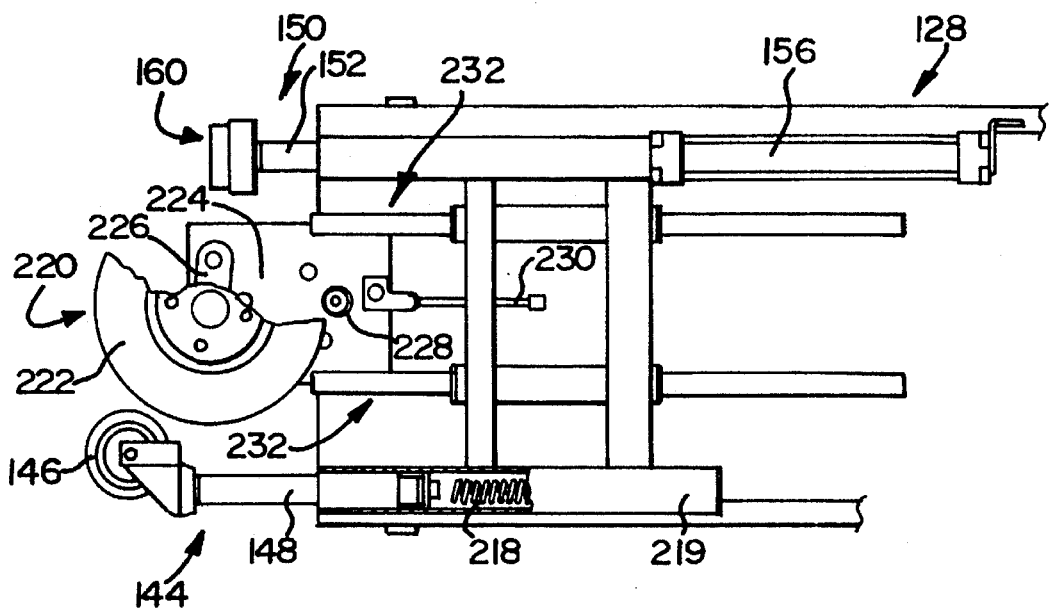
FIG 7
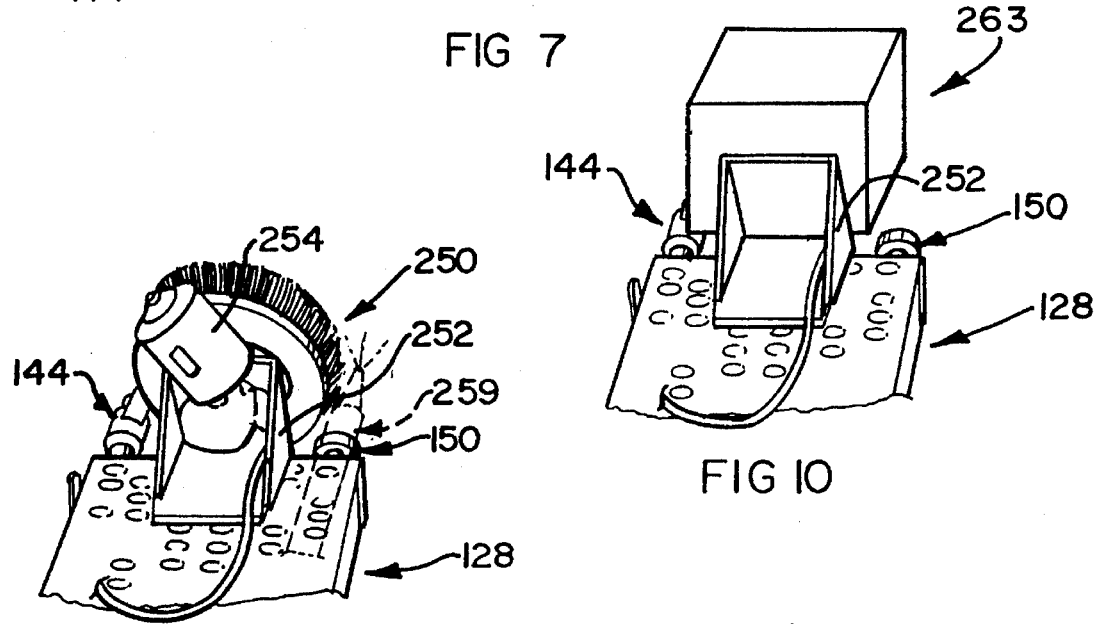
FIG 8
FIG 10
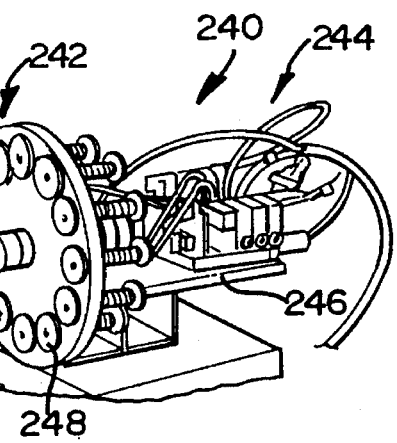
FIG 9

METHOD AND SERVICING INTERIOR OF LARGE CONTAINER AND SERVICE APPARATUS

FIELD OF THE INVENTION

This Invention relates to servicing of large containers. It relates more specifically to a method of servicing an interior of a large container, and to a servicing apparatus suitable for use inside a large container.

BACKGROUND

The Applicant envisages that this invention will advantageously be applicable in inspection, maintenance and other services, like cleaning, in respect of large vessels or containers in the food and beverage industry, the petro-chemical industry, or the like. The invention is, however, not limited to those fields.

In accordance with a first aspect of this invention, there is provided a method of servicing an interior of a large container, which container comprises a narrow opening providing access to the interior, the method including providing a collapsible service apparatus;

inserting the apparatus, while in a collapsed condition, through the opening;

deploying the service device, when within the interior, into an operative condition such that extremities of the device extend toward a wall of the container; and performing a service operation on an internal wall surface of the container while supported on the apparatus at a position toward one of said extremities.

When said narrow opening is at a top of the container, inserting the apparatus through the opening may be by means of a suspension element anchored externally of the container. The method may then include selectively raising and lowering the apparatus by winching said suspension element appropriately. A winch supported externally of the container may be provided to effect winching.

The apparatus may include a central chine and a plurality of arms attached at one ends of the arms to the chine and extending generally longitudinally with the chine while the apparatus is in said collapsed condition. Deploying the apparatus may include opening the arms outwardly to extend generally away from the chine. Conveniently, said one ends of the arms may be pivoted to the chine. The apparatus may include a collar movable to and fro along the chine and stays extending pivotally between the collar and positions on the arms spaced from said one ends. Opening of the arms may then be effected by appropriately displacing the collar along the chine. Displacing the collar may be by rotating a lead screw relative to a complemental screw thread, the lead screw being located on one of the collar and the chine and the screw thread being located on the other of the collar and the chine. Advantageously, in the interest of stability, the length of the chine may be at least about one half the nominal diameter of the container.

By way of development, the method may include abutting said internal wall surface of the container by means of rollers at ends of the arms and guiding the apparatus against said wall.

Instead or preferably in addition, the method may include selectively abutting said internal wall surface by means of stabilizing members at ends of the arms thereby to stabilize the apparatus against said wall to keep the apparatus at even keel in use.

Performing the service operation may be effected manually by means of at least one operator supported within the container on the apparatus.

Instead, performing the service operation may be mechanically by means of a mechanical device. Thus, performing the service operation may include one of:

rubbing said internal wall surface by means of bristles, brush-fashion, mounted on the apparatus;

inspecting said internal wall surface by means of a video camera mounted on the apparatus;

taking samples of matter at predetermined positions on said internal wall surface by pressing appropriate sample adhering surfaces against said internal wall surface at said predetermined positions;

performing a welding operation;

performing an electroplating operation; and performing a plasma spray depositing and electropolishing operation, and the like.

Advantageously, the method may include controlling the mechanical device from a remote position. The method may further include mechanically moving the apparatus within the container, moving including at least one of raising, lowering and pivoting the apparatus. The method may then include controlling operation of the mechanical device and moving of the apparatus by means of programmable logic.

By way of development, the method may include recording transient positions of said mechanical device relative to the inner wall surface against time. This feature will enable a service operation to be performed automatically, under programmed logic control, at predetermined positions of the internal wall surface.

In accordance with a further aspect of this invention, there is provided a service apparatus suitable for use inside a large container having a narrow opening providing access to an interior thereof, the service apparatus including an elongate central chine;

a plurality of arms attached at one ends of the arms to the chine such that the arms are movable between collapsed conditions in which they extend alongside the chine to allow the service apparatus to pass through said narrow opening and deployed conditions in which they are opened to extend outwardly away from the chine; and stays arranged to stay the arms in the deployed conditions such that, when the arms assume decumbent orientations, they can support weight.

In the service apparatus said one ends of the arms may be pivoted to the chine;

the service apparatus may include a collar movable to and fro along the chine; and the stays may be pivoted at opposed ends respectively to the collar and at positions on the arms spaced from said one ends, deploying and collapsing of the arms being effected in use by appropriately displacing the collar to and fro along the chine.

The service apparatus may thus include deploying means comprising a lead screw anchored on one of the chine and the collar, a complemental screw thread receiving the lead screw and being located on the other of the chine and the collar, and rotary drive means arranged to effect relative rotation between the lead screw and the screw thread.

By way of development, the service apparatus may include rollers arranged at ends of the arms to abut and roll against an internal wall surface of the container to guide the apparatus. At least one of said rollers may drivingly be connected to rotary drive means selectively to drive the apparatus relative to said internal wall surface.

Further by way of development, instead, or in addition, the service apparatus may include stabilizing members at ends of the arms and displacement means selectively to extend the stabilizing members to abut an internal wall surface of the container to stabilize the apparatus against a wall of the container to keep the apparatus at even keel in use.

In a preferred embodiment, the service apparatus may include a mechanical service device and mounting means for mounting the mechanical service device toward an extremity of one of the arms. The mechanical service device may be one of a rubbing device having bristles and drive means for the bristles to cause the bristles to perform a rubbing action against an internal wall surface of the container;

a video camera for taking visual images of said internal wall surface;

sample taking means adapted to press sample adhering surfaces against said internal wall surface at predetermined positions to take samples of matter at said positions;

welding apparatus arranged to deposit a welding material at a predetermined position on said internal wall surface;

an electroplating device suitable to perform an electroplating operation on said internal wall surface;

a plasma spray depositing and electropolishing device suitable to perform a plasma spray depositing and electropolishing operation on said internal wall surface.

It is envisaged that more than one of these mechanical service devices may be provided, and that such devices can readily be mounted on and dismounted from the arm. All or some of the devices may be mountable on common mounting means provided on the arm.

The service apparatus may have mounting means for suspending the chine from a suspension element to allow the apparatus to be suspended within the container via the suspension element.

The service apparatus may then include winch means including said suspension element attached to the chine, the winch means being supportable externally of the container and being adapted to winch the suspension element in and out respectively to raise and lower the apparatus in the container.

The service apparatus may include displacements means for selectively displacing the apparatus in respect of at least one of pivoting, raising and lowering the apparatus within the container. Pivoting may be effected by the driven roller, and raising and lowering may be effected by the winch means. The service apparatus may then include remote control means for controlling the displacement device and the mechanical service device from a position externally of the container. The remote control means may include programmable logic control means.

BRIEF DESCRIPTION OF THE FIGURES OF THE DRAWING

The invention is now described by way of example with reference to the accompanying diagrammatic drawings. In the drawings

FIG. 7 shows, fragmentally, in plan view, to a larger scale, components located at an outer end of an arm of the apparatus of FIG. 4;

FIG. 8 shows, fragmentally, in three dimensional view, cleaning means forming part of the apparatus of FIG. 4;

FIG. 9 shows, in three dimensional view, sampling means forming part of the apparatus of FIG. 4; and FIG. 10 shows, in a view corresponding to FIG. 8, schematically a service device mounted on an arm of the apparatus of FIG. 4.

DETAILED DESCRIPTION OF PREFERRED EMBODIMENT

Figure 1:
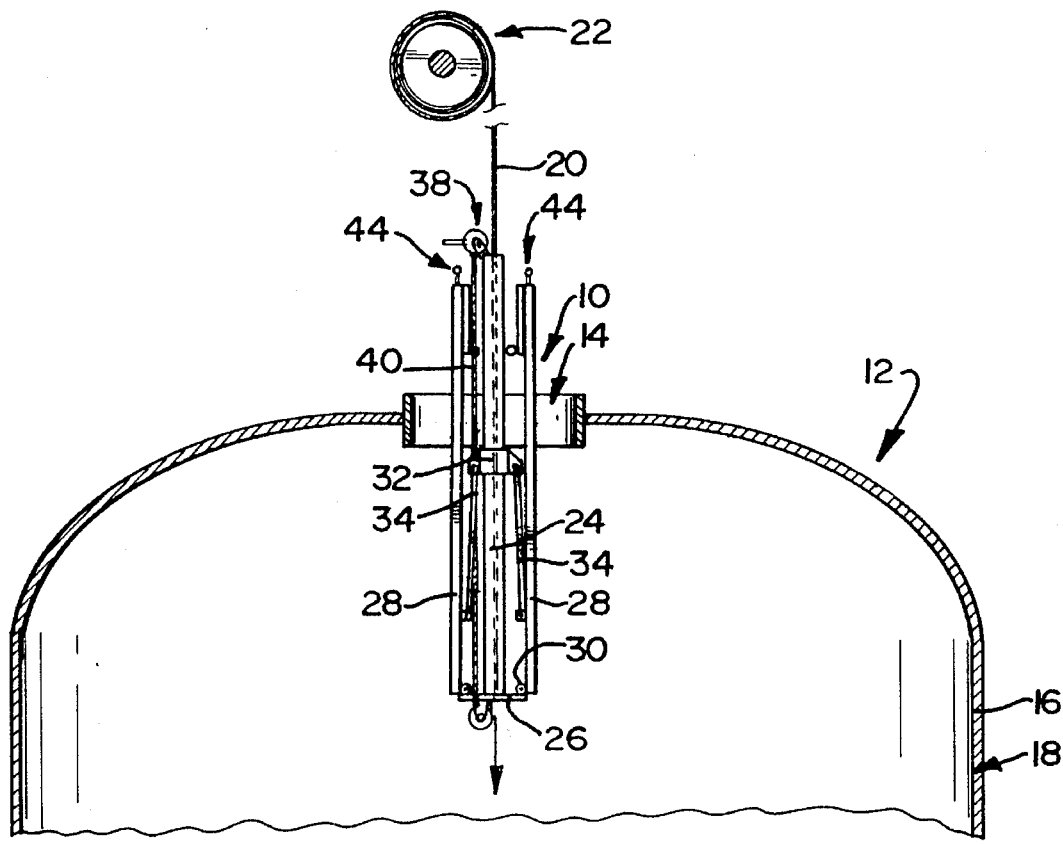
FIG. 1 shows, fragmentarily, in section, a simple embodiment of a service apparatus in accordance with the invention being lowered into a container immediately prior to being used.
Figure 2:
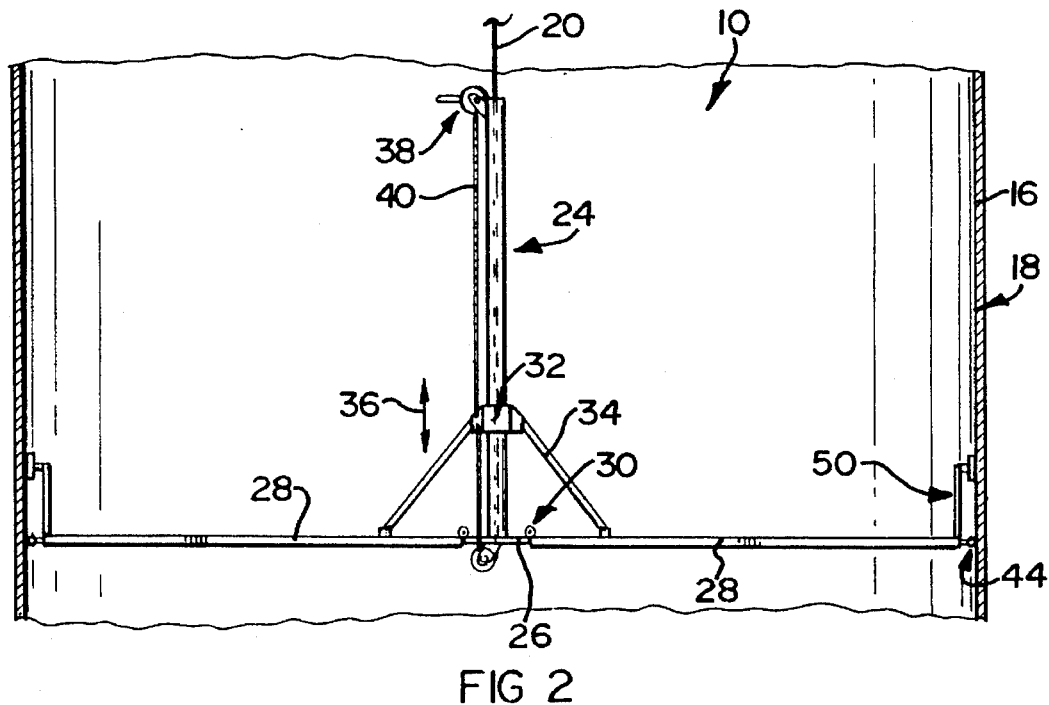
FIG. 2 shows, in a view corresponding to FIG. 1, the apparatus deployed within the container.
Figure 3:
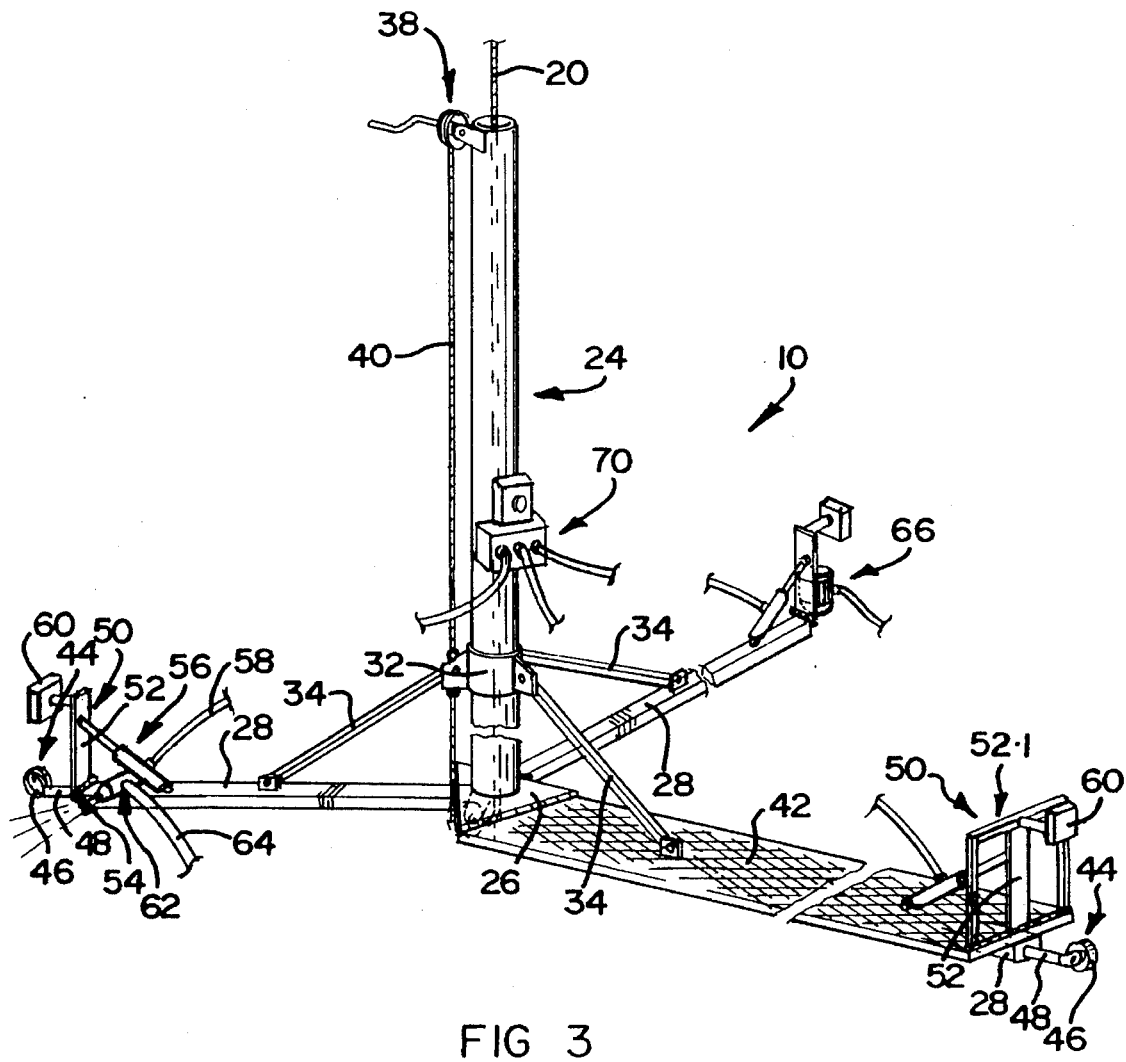
FIG. 3 shows, in three dimensional view, the apparatus of FIGS. 1 and 2 in its deployed condition.

With reference to FIGS. 1, 2 and 3 of the drawings, a service apparatus in simple format in accordance with the invention is generally indicated by reference numeral 10. The service apparatus 10 is intended for use with relatively large containers, especially in the food and beverage industry, such as the container or vessel indicated by reference numeral 12. The container 12 is of generally cylindrical form having a domed upper end and a narrow upper opening 14 through which entry into the interior of the container 12 is to be obtained. The container 12 has a cylindrical side wall 16 having an internal surface 18. The invention relates to servicing said internal surface 18, such as by way of inspection, maintenance, cleaning and the like. The surface 18 will generally be of stainless steel, but may be of glass, in the form of a resin liner, or similar fragile material.

The container 12 can be high, of the order of up to 20 m or more. It may have a nominal diameter of typically about 3 m or more. Thus, the container 12 is large. Furthermore, the opening 14 is narrow, typically of the order of 400mm diameter.

The service apparatus 10 in accordance with the invention is collapsible as shown in FIG. 1 to allow it to be lowered through the narrow opening 14 in its collapsed condition. Once inside the container 12, the service apparatus 10 can be extended or deployed generally as indicated in FIGS. 2 and 3. In its deployed condition, it can support one or more operators who can then use the apparatus, inter alia, in the manner of a platform to allow access to the surface 18 of the side wall 16.

The service apparatus 10 includes a central body or chine 24 in the form of a hollow shaft. At a lower end of the shaft 24, there is fixed a polygonal base 26 which, in this embodiment, is triangular. To each side of the polygonal base 26, there is hinged, as indicated by reference numeral 30, an arm 28 which, by virtue of the hinge 30, is movable between a collapsed condition as shown in FIG. 1 in which each arm extends longitudinally or axially, decumbently with the shaft 24, and a deployed condition as shown in FIGS. 2 and 3 in which the arms 28 are folded open to extend outwardly, generally radially, from the base 26 generally at right angles to the shaft 24. The chine or shaft 24 has a length equal to at least half the nominal diameter of the container 12.

The arms 28 are conveniently pivotal by means of a deploying assembly comprising a collar 32 slidable along the shaft 24 as indicated by reference numeral 36, and three stays 34, respectively pivotally attached between the collar 32 and the respective arms 28. Thus, when the collar is displaced upwardly relative to the shaft 24, the arms 28 are folded to the collapsed condition. If the collar 32 is displaced downwardly, the arms 28 are folded open. The arms 28 can conveniently be locked in their deployed conditions by means of a check formation on the shaft 24 to check downwardly displacement of the collar 32.

The arms 28 can be supported in their deployed conditions by means of support cables (not shown). A cable can extend from an outer end of each arm to an upper location on the shaft, so that when the arms are in their deployed conditions the support cables are in tension.

It is to be appreciated that the arms 28, on account of their weight, will be biassed to an open condition. Thus, a manually operable winch 38 is provided at an upper end of the shaft 24 and has a rope 40 attached to the collar 32. By means of the winch 38 and the rope 40, the collar 32 can be hoisted upwardly to fold the arms 28 into their collapsed condition. An arrangement, which is preferred to this arrangement, however, is described hereinbelow.

At an outer end of each arm 28, there is provided a castor assembly 44 comprising a castor wheel 46 mounted at an end of an arm 48. The castor assembly 44 is advantageously resiliently biassed outwardly by means of a spring received within the arm 28 and not shown in the drawings. Thus, in use, the resilient bias will ensure that the castor wheels 46 run against the inner surface 18. Dimensional inaccuracies and tolerances in the apparatus 10 and also in the container 12 are accommodated by the resilient biassing.

At least one arm 28 carries a cat walk 42 in the form of a grid to allow an operator to walk along the arm 28 from the body 24 toward the side wall 16.

The apparatus 10 is suspended by means of a cable 20 from a mechanical hoist 22 anchored externally of the container 12. The apparatus 10 can be raised and lowered into and out of the container 12, and also within the container 12 by means of the hoist 22.

By way of development, stabilizing means 50 is provided for each arm 28. Each stabilizing means 50 comprises a lever 52 pivoted or hinged as indicated by reference numeral 54 at one end of the lever 52 at an outer end of its arm 28. A pneumatic plunger and cylinder arrangement 56, serviced by a compressed air line 58, is operatively arranged between the lever 52 and the arm 28 to displace the lever 52 between a collapsed condition in which it extends generally decumbently with its arm 28, and an extended condition in which it extends upwardly from the end of the arm 28, generally at right angles. At a free end of the lever 52, and extending outwardly, there is provided a grip pad 60 by means of which the inner surface 18 of the side wall 16 is abutted in use.

The stabilizing means 50, when operative, stabilizes the device against the container.

Another, preferred, embodiment of stabilizing means is disclosed hereinbelow.

Further by way of development, there is provided a nozzle assembly 62 toward an outer end of one arm 28. The nozzle assembly 62 is supplied by means of a supply line 64. The nozzle assembly 62 can be arranged in oblique fashion such that a fluid can be sprayed obliquely tangentially against the surface 18.

With reference to FIG. 3, a motor generally indicated by reference numeral 66 may be provided at the end of at least one arm. A drive wheel, not shown, is drivingly connected to the motor 66 to ride along the surface 18 to propel the apparatus 10 in an appropriate direction.

Cables (not shown) may connect one arm to another to maintain their angular spacing. Thus, for example, when the apparatus 10 is propelled by the drive wheel, the arms are supported in their positions relative to each other by means of said cables.

A control panel 70 is provided against the shaft 24 to be accessible to an operator standing on the cat walk 42 and by means of which the various functions of the apparatus 10 can be controlled.

It is to be appreciated that the application of the invention is not limited to the type of container mentioned hereinabove. The invention is also applicable for use in, for instance, servicing of containers of the type having a lower narrow side opening as is used in the wine making industry. In such a case the collapsible service apparatus can be inserted through the opening, deployed inside the container and may be elevated by means of eg. a pneumatic telescopic cylinder arrangement.

It is an advantage of the invention that a platform is provided which can be inserted into a container of the kind described through its narrow opening and can be deployed within the container to provide a work platform for personnel.

It is a further advantage that the apparatus 10 acts as a carrier for mechanical service apparatus which can be used within the container 12, if desired from remote positions.

It is an advantage that, in accordance with the invention, close access can be obtained to an inner surface of a side wall of a food or beverage container, a petrolchemical container, or the like, to allow inspection and the like.

A more sophisticated, and preferred, embodiment of a collapsible service apparatus in accordance with this invention is now described by way of further example with reference to FIGS. 5 to 9 of the drawings. The service apparatus is generally indicated by reference numeral 110. The service apparatus 110 is more sophisticated and has more accessories or auxiliary service components than the collapsible service apparatus 10 of FIGS. 1 to 3. However, broadly, the service apparatus 110 is similar to the service apparatus 10 and like reference numerals refer to like components.

Figure 4:
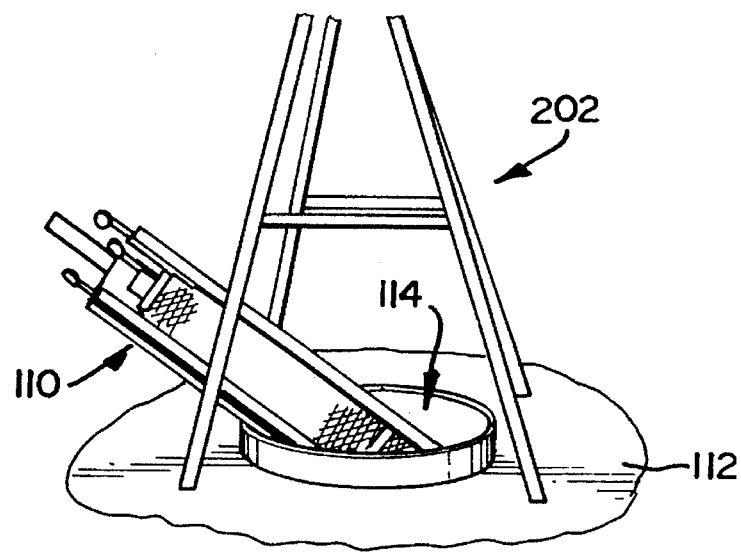
FIG. 4 shows, fragmentarily, in three dimensional view, another embodiment of a collapsible service apparatus in accordance with this invention in the process of being introduced into a vessel having a narrow opening at an upper end thereof.

With reference more specifically to FIG. 4, the collapsible service apparatus 110 is shown in its collapsed condition and is being introduced into a vessel 112 via a narrow top opening 114 thereof. The service apparatus 110 is man-handled by an operator through the opening 114. The apparatus 110 is supported from a winch mounted at an upper end of a gantry 202 as will be described in more detail with reference to FIG. 5. The winch may be hydraulically or electrically (low voltage direct current) driven. It is important to appreciate that the apparatus 110, in its collapsed condition, is narrow—at least sufficiently narrow to pass through a 400 mm diameter opening. Furthermore, the apparatus 110 is of relatively light weight, advantageously less than about 100 kg. It is conveniently contained within a bag of flexible material.

Figure 5:
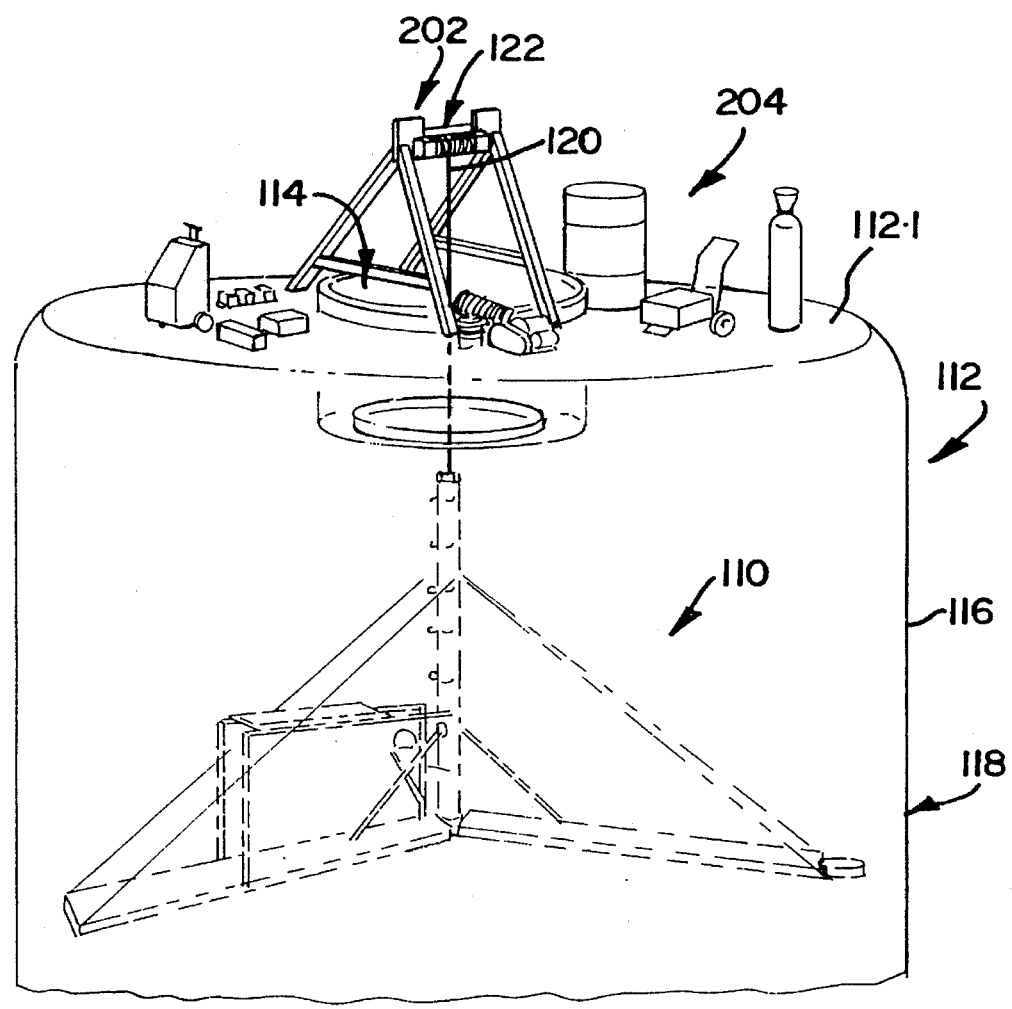
FIG. 5 shows, in a view corresponding to FIG. 4, the service apparatus in a deployed condition within the vessel.

With reference more specifically to FIG. 5, the gantry 202 is shown being free-standing over the opening 114. It mounts a winch 122 mounted about a transverse axis and which is electrically operable, conveniently by means of a low voltage direct current electric motor e.g. between about 12 and about 36 volts, say 24 volts. Thus, the winch can be operated from readily available lead acid batteries. Instead, it may be hydraulically driven by means of a hydraulic motor.

By way of development, in the interests of safety, a pair of winches may be used in parallel being attached to the apparatus 110 by means of separate cables and being operable by means of separate drive motors. However, it is preferred that the winches be operable from a common control panel.

Reference numeral 204 indicates generally accessories or auxiliary components which can be used with the collapsible service apparatus 110. Those accessories or auxiliary components will depend on the intended use of the apparatus but may include components like ventilating means for providing ventilation within the vessel 112, a cleaning solution for cleaning interior surfaces of the vessel 112, gas welding apparatus, containers for samples, lighting means, and the like.

The apparatus 110 is shown in its deployed condition within the container 112, depending via a cable 120 from the winch 122.

Figure 6:
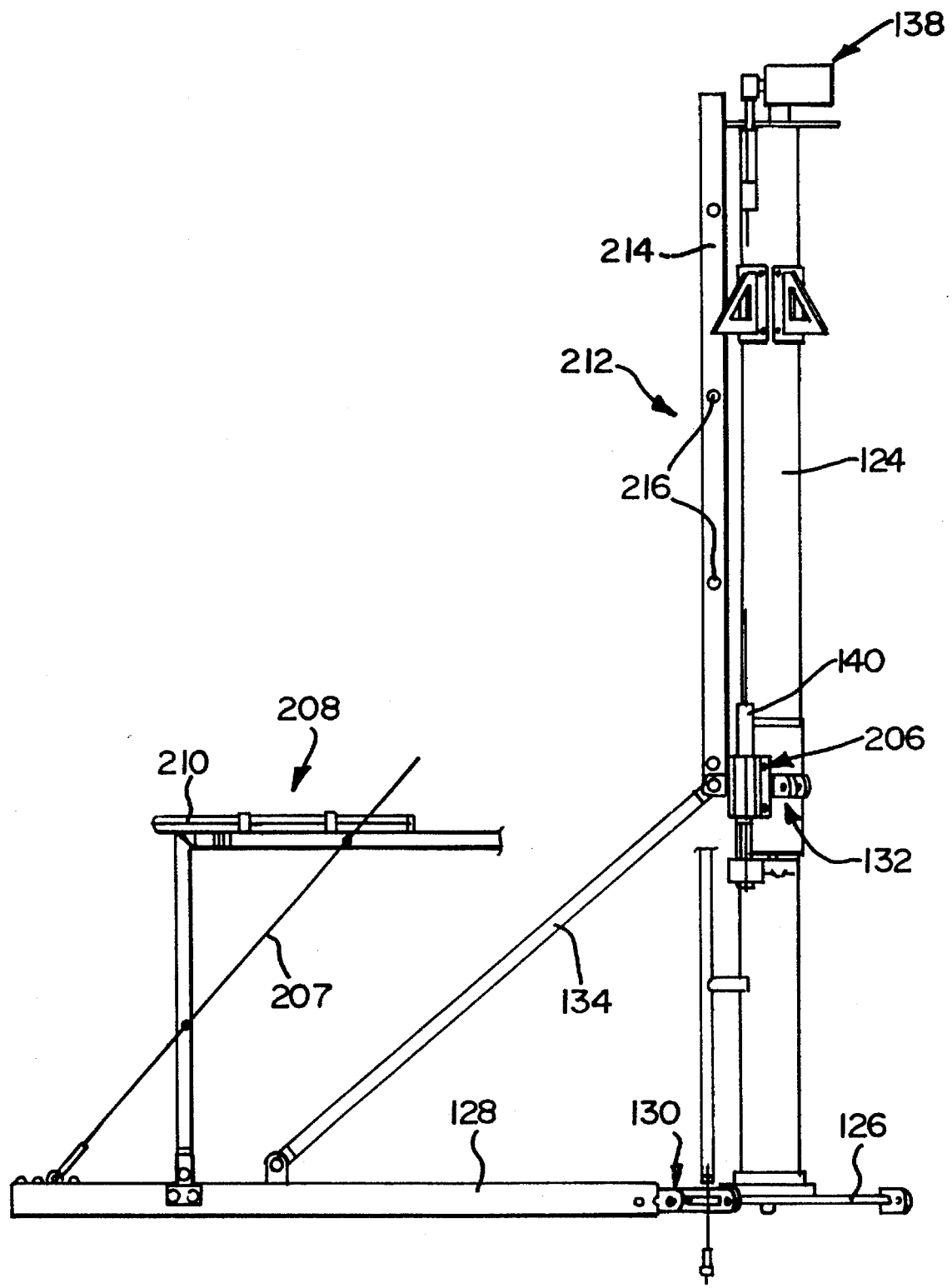
FIG. 6 shows, to a larger scale, in side view, features of construction of a central post and one arm of the apparatus of FIG. 4.

With reference more specifically to FIG. 6, it is shown that displacement of the collar 132 up and down the hollow post or chine 124 respectively to collapse and to deploy the arms 128, is effected by means of a lead screw 140 which is mounted for rotation along the post 124. The lead screw 140 is threadingly engaged with a threaded bush 206 located on the collar 132 and is driven by means of a motor 138. The motor is conveniently a low voltage direct current motor, e.g. a 24 volt DC motor.

Outer ends of the arms 128 are stayed by means of stay cables 207. It is to be appreciated that the arm 128 is supported by means of the hinge 130, the stay in the form of a rod 134 and the stay cable 207 and that only two of those support means are sufficient to support the arm 128. Thus, for example, the integrity of the hinge 130 is not critical.

The collapsible service apparatus includes a ladder 212 in the form of a central chine 214 and a plurality of transversely extending foot rests 216. The chine 214 is mounted on the central post 124. The ladder 212 is intended for use when the collapsible service apparatus 110 is spaced relatively closely underneath the opening 114 of the vessel 112, and in its deployed condition, to allow personnel to climb down from the domed top of the vessel 112 to the service platform and vice versa.

The service apparatus has three arms 128, only one of which is intended for use by personnel. That arm 128 has a safety rail formed by linkages generally indicated by numeral 208 arranged, in co-operation with the central post 124 and the arm 128, in the nature of a parallelogram thus to be collapsed when the arms 128 are collapsed, and deployed when the arms are deployed. By way of development, a U-shaped, outwardly slidably extension 210 is provided on the rails to allow personnel to walk to the end of the arm 128 still within the confines of the rails.

With reference to FIG. 7, an end portion of one arm 128 is shown. The specific arm shown is used to drive the apparatus in a rotary direction about the post 124. The arm 128 of FIG. 7 carries guide means 144 and stabilizing means 150 which will be described hereinafter and which are provided on each of the other two arms as well.

The guide means 144 includes a castor wheel 146 at an end of a shaft 148 which is resiliently received via a spring 218 arranged to operate in compression within a sleeve 219. The spring 218 biasses the castor wheel 146 outwardly such that, in use, it will run against an inner surface 118 of the vessel 112. The castor wheel 146 has a tread, conveniently of light grey Neoprene, and selected not to leave traces on the inner surface 118.

The stabilizing means 150 includes a ram 152 which is reciprocal by means of a pneumatic plunger and cylinder arrangement 156. The ram 152 carries a foot 160 of soft synthetic material e.g. light grey Neoprene. When the apparatus 110 is to be stabilized in a desired position within the vessel 112, the pneumatic plunger and cylinder arrangement 156 of each arm is extended to urge the respective foot 160 against the inner surface 118. When the apparatus is to be moved again, the pneumatic plunger and cylinder arrangement 156 is contracted to retract the ram 152 and foot 160.

Advantageously, there is provided an interlock system between the stabilizing means 150 and the winch 122 such that they cannot be operated simultaneously i.e. such that the winch can be utilized only when the pneumatic plunger and cylinder arrangements are in their contracted conditions.

The specific arm 128, as mentioned above, carries drive means generally indicated by reference numeral 220. The drive means includes a drive wheel 222 rotatable about an upwardly directed axis such as, in use, to drive the collapsible service apparatus 110 in a rotary direction. The wheel 222 has a tread, e.g. of light grey Neoprene, selected not to leave traces on the inner surface 118.

The wheel 222 is mounted for rotation about its axis on a cradle 224, more specifically via a swing arm 226. The wheel 222 can be driven via a capstan 228 drivingly connected to a low voltage direct current motor, more specifically a 24 volt DC motor mounted underneath the arm 128 and which is not visible in the drawing. Instead, it may be driven by means of a hydraulic or pneumatic motor.

The cradle 224 is guided by means of generally radially extending, circumferentially spaced guide means 232 and displacement and subsequent anchoring in a desired radial position are effected via an anchor and displacement push rod 230. The push rod 230 may be extensible and contractible pneumatically.

With reference to FIG. 8, the apparatus 110 has rotary cleaning means generally indicated by reference numeral 250 and in the form of a rotary brush mounted for rotation about a radially extending axis at an end of one arm 128 via a bracket 252. It is rotatable by means of a motor 254 drivingly connected to the rotary brush via an angled drive. The arm 128 mounting the cleaning brush 250 is the third arm 128 i.e. neither the arm intended for use by personnel, nor the arm carrying the drive means 144.

It is shown that the arm carrying the rotary brush 250 also has the guide means 144 and the stabilizing means 150.

The bracket 252 can readily be mounted on and dismantled from the end of the platform 128.

If desired, the rotary cleaning brush 250 can be utilized in combination with a spray nozzle 259 which can be directed generally radially outwardly and arranged to direct fluid on the inner surface 118 adjacent the rotary brush 250. Such nozzle may be adapted to provide a pulsating flow.

Further by way of development, and with reference more specifically to FIG. 9, swabbing means generally indicated by reference numeral 240 may selectively be mounted at an end of the arm 128 of FIG. 8 in place of the rotary brush. The swabbing means 240 can, likewise, readily be mounted on and dismantled from the end of that arm 128.

The swabbing means 240 includes an indexing head 242 having, in this embodiment, twelve positions. At each position, there is provided a sampling head 248 at an end of a generally radially extending shaft 246 which can, selectively, be used as a ram to engage the inner surface 118 with its swabbing head and which can selectively also be rotated. Drive means for the various shafts 246 is indicated by reference numeral 244 and may be pneumatic drive means.

Rotation of the indexing head 242 is controllable via the central control means.

Each swab head 248 may conveniently have releasable attachment means such as Velcro strips attached thereto selectively to attach sample adhering means such as a swab to take a sample of the inner surface 118 at a preselected position.

As shown in FIG. 10, in similar manner to what was described in FIGS. 8 and 9, on the same arm, a camera and focusing means for the camera may be mounted. Such a camera may be a video camera, schematically indicated by reference numeral 263.

Instead, other service devices, such as a welding device, an electroplating device, a plasma spray depositing and electropolishing device, may be provided and may be mountable and dismantleable as shown in respect of the video camera 263 in FIG. 10.

The service apparatus 110 has the advantages of the apparatus 10. Those advantages are, for reasons of economy, not repeated. The service apparatus 110, however, has a number of additional advantages, some of which are mentioned below.

The apparatus 110 has central control means which can be integrated with programmable logic. This enables the apparatus 110 to be operated automatically. Thus, for example, the inner surface 118 can be inspected by means of the video camera. It is to be appreciated that micro and macro images can be obtained. Furthermore, the surface 118 can be cleaned by means of the rotary brush and nozzle. Yet further, samples of matter on the inner surface 118 can be obtained by means of the sampling means.

By way of development, motion of the apparatus 110, both in an angular direction and in an axial direction can be recorded via, for example, one of the castor wheels 146 by measuring the orientation of the ram 148 and the rotation of the wheel against time and translated into position against time in a manner similar to operation of a "mouse" in computer technology. This feature enables the apparatus to be manoeuvred into a predetermined position, for example to cause samples to be taken at predetermined positions.

It is a general advantage that the apparatus can be used in automatic mode even in an environment which is hostile to humans.

What is claimed is:

1. A service apparatus suitable for use in servicing an internal wall of a large, stationary, round cylindrical container which has a narrow access opening only in a top thereof, the service apparatus including an elongate chine having connection means for connecting the chine to an elongate suspension element for suspending the service apparatus in use within the container via said narrow access opening;

a plurality of radial arms, each arm having a radially inner end and a radially outer end, each arm being pivoted by its radially inner end to the chine to be pivotal between a collapsed condition in which each arm extends recumbently alongside the chine to allow the service apparatus to pass through the narrow access opening, and a deployed condition in which each arm extends generally radially away from the chine;

deploying means connected between the chine and the respective radial arms and being selectively operable to cause progressive pivoting of the arms between their collapsed conditions and their deployed conditions, and between their deployed conditions and their collapsed conditions;

stays connected between the respective arms and the chine to stay the respective arms against the chine such as to be able to support weight when the arms are in their deployed conditions; a roller mounted at the radially outer end of each arm by means of mounting means allowing each arm to be resiliently displaceable within limits to allow limited extension and contraction of each arm, the rollers being positioned generally on a circle diameter falling in a predetermined range of diameters to allow the rollers, in use, resiliently rolling to abut said internal wall to be serviced which internal wall is round having a diameter within said range of diameters, the rollers being arranged symmetrically around the chine to cause reaction forces of the wall on the rollers to be in balance.

2. A service apparatus as claimed in claim 1 in which the deploying means includes a collar which is movable to and fro along the chine and displacement means for selectively displacing the collar to and fro along the chine, one of the ends of the stays being pivoted to the arms at positions spaced from the radially inner ends of the arms and opposed ends of the stays being pivoted to the collar.

3. A service apparatus as claimed in claim 1 in which the displacement means comprises a lead screw anchored on one of the chine and the collar, a complemental screw thread receiving the lead screw and being located on the other of the chine and the collar, and rotary drive means arranged to effect relative rotation between the lead screw and the screw thread.

4. A service apparatus as claimed in claim 1 which includes rotary drive means for selectively driving the service apparatus circumferentially relative to the container, the rotary drive means including a drive wheel arranged at the radially outer end of one radial arm drivingly to abut the inner wall in use, a rotary drive motor and transmission means drivingly connecting the drive wheel to the rotary drive motor.

5. A service apparatus as claimed in claim 4 in which the drive wheel is separate from the roller of said one radial arm, the drive wheel being mounted by means of mounting means which is selectively adjustable between a withdrawn condition in which the drive wheel is withdrawn from contact with the internal wall and an extended condition in which the drive wheel is urged into driving contact with the internal wall.

6. A service apparatus as claimed in claim 5 in which the mounting means includes a cradle on which the drive wheel is rotatably supported, generally radially extending slide means on which the cradle is slidable, and a pressurized fluid operable plunger and cylinder arrangement arranged selectively to slide the cradle to and fro along the slide means between said withdrawn condition and said extended condition of the drive wheel.

7. A service apparatus as claimed in claim 1 which includes stabilizing members at radially outer ends of at least two arms and which are displaceable between withdrawn conditions in which the stabilizing members are withdrawn from contact with the internal wall to render the service apparatus free to be moved and extended conditions in which the stabilizing members abut the internal wall to hold the service apparatus stationary, displacement means selectively to displace the stabilizing members between their withdrawn and extended conditions, the stabilizing members being symmetric relative to the chine to cause reaction forces exerted by the internal wall on the service apparatus when the stabilizing members are in their extended conditions to be balanced.

8. A service apparatus as claimed in claim 1 which includes a rotary drive means mounted on a radial arm for selectively driving the service apparatus circumferentially relative to the container, a rotary drive means control for selectively operating the rotary drive means, stabilizing members mounted on at least two radial arms such as to be displaceable between withdrawn conditions in which the stabilizing members are withdrawn from the internal wall and extended conditions in which the stabilizing members abut the internal wall, and interlocking means operative between the stabilizing members and the rotary drive means control to prevent the rotary drive means from being operated if the stabilizing members are in their extended conditions, 9. A service apparatus as claimed in claim 1 in which one radial arm includes a walkway and a collapsible railing adjacent the walkway to allow an operator to approach the internal wall manually to perform a servicing operation on the internal wall.

10. A service apparatus as claimed in claim 1 which includes a mechanical servicing device operatively mounted at the radially outer end of one radial arm in a radial position and orientative mechanically to perform a servicing operation on the internal wall.

11. A service apparatus as claimed in claim 1 which includes a plurality of mechanical servicing devices and mounting means at the radially outer end of one radial arm for selectively and replaceably mounting the mechanical servicing devices.

12. A method of servicing a round cylindrical inner wall of a large stationary container having a narrow access opening through a top thereof, the method including passing a collapsible service apparatus in collapsed condition through the narrow access opening;

suspending the service apparatus within the container by means of an elongate suspension element anchored externally of the container and extending through the narrow access opening;

deploying the service apparatus by progressively pivoting a plurality of radial arms from collapsed conditions in which the arms extend alongside a central chine to deployed conditions in which the arms extend generally radially away from the chine;

staying the respective arms against the chine such as to enable the arms to support weight by means of stays connected between the respective arms and the chine;

rollingly resiliently abutting said round cylindrical inner wall by means of rollers which are mounted at radially outer ends of the respective arms such as to be resiliently urged generally radially outwardly;

balancing reaction forces applied by the inner wall to the rollers by having the rollers arranged symmetrically about the chine;

using the service apparatus as a substrate and performing a servicing operation on the inner wall.

13. A method as claimed in claim 12 which includes rotating the service apparatus circumferentially relative to the container by rollingly abutting the internal wall surface by means of a wheel and driving the wheel by means of a rotary drive motor provided for that purpose, the wheel and the rotary drive motor being mounted on an arm.

14. A method as claimed in claim 12 which includes holding the service apparatus stationary against the inner wall of the container by extending stabilizing members from withdrawn positions relative to the inner wall to extended conditions and the abutting the inner wall symmetrically to balance reaction forces of the inner wall against the stabilizing members.

* * * * *